United States Patent [19]

Nicholson

[11] 4,335,890
[45] Jun. 22, 1982

[54] GASKET FOR CYLINDER HEAD

[76] Inventor: Terence P. Nicholson, Calf Hall, Muggleswick, Derwentside, Co. Durham, England

[21] Appl. No.: 133,844

[22] Filed: Mar. 25, 1980

[30] Foreign Application Priority Data

Dec. 3, 1979 [GB] United Kingdom ............... 7941630

[51] Int. Cl.³ ............................................. F16J 15/08
[52] U.S. Cl. ................................ 277/235 B; 277/213; 277/236
[58] Field of Search ............. 277/235 B, 166, DIG. 6

[56] References Cited

U.S. PATENT DOCUMENTS 3,606,361  9/1971  Pohl et al. ...................... 277/235 B
4,121,846 10/1978  Skrycki ........................... 277/235 B

FOREIGN PATENT DOCUMENTS 1549200  7/1979  United Kingdom ............ 277/235 B

Primary Examiner—William Price

[57]  ABSTRACT

A gasket for sealing the joint between the cylinder block and the cylinder head of wet liner internal combustion engine formed a pair of outer metal plates, and a composite metal spacer plate disposed between the two outer plates. Incorporated between the outer metal plates and around each cylinder bore opening is a washer having on each face circumferential serrations of V-shaped profile.

2 Claims, 7 Drawing Figures

GASKET FOR CYLINDER HEAD

BACKGROUND OF THE INVENTION

This invention relates to a gasket particularly but not exclusively intended for sealing the joint between the cylinder block and the cylinder head of a wet liner internal combustion engine.

In my co-pending patent application Ser. No. 930,429, now U.S. Pat. No. 4,203,608, there is described an improved form of gasket which is suitable for use in dry liner internal combustion engines.

However, unfortunately, this particular form of gasket has been found to be unsuitable for use in wet liner internal combustion engines. The reason for this is that in the production of wet liner internal combustion engines the cylinder bore liners have essentially to protrude beyond the face of the cylinder block rather than to terminate below it. The criteria to be satisfied by the gasket are twofold, namely (a) that there should be a sufficient load on the liner to make a gas seal and (b) that there should not be an excessive load such as would cause the rim of the liner to fracture from the liner wall. The consequence of any attempt to seal the liner also using a gasket as previously proposed is that the load on the liner rim would be greatly excessive.

A theoretical solution to the problem would be to use a gasket of the kind disclosed in my above-mentioned co-pending application and to machine the central non-corrugated metal sheet thereof around each of the cylinder bores to allow for liner protrusion. This is however not practical because of the machining tolerances which are necessary.

The present invention is based upon the realization that there should be an independent seal or sealing element for each of the cylinder bores of a wet liner engine. Any such sealing element must possess the ability to apply a high, but not excessive, unit load, that is to say the clamping load needs to be concentrated in a closely defined area. Also, because of varying heights of liner rim from one engine or cylinder bore to another such a sealing element must be able to cope with quite substantial variations.

A gasket incorporating firstly a solid soft washer, and secondly, a soft washer formed around its perimeter with a multiplicity of closely spaced perforations parallel to its axis proved unsatisfactory. In the first instance the load on the rim has to be far too great in order to form a successful gas seal, and in the second instance the washer spreads both radially inwards and radially outwards which is unacceptable.

SUMMARY OF THE INVENTION

According to the present invention, the gasket comprises a pair of outer metal plates and a composite metal spacer plate disposed between the two outer plates. Such a gasket is characterized in that it incorporates around each cylinder bore opening a sealing washer formed on each axial face with circumferential serrations of V-shaped profile, the thickness of the washer measured over the peaks of the serrations being somewhat greater than that of the composite spacer plate whereas the thickness measured between the troughs of the serrations is significantly less than that of the spacer plate.

BRIEF DESCRIPTION OF THE DRAWINGS

A preferred gasket in accordance with the present invention is illustrated in the accompanying drawings, in which.

DESCRIPTION OF THE INVENTION

Figure 1:
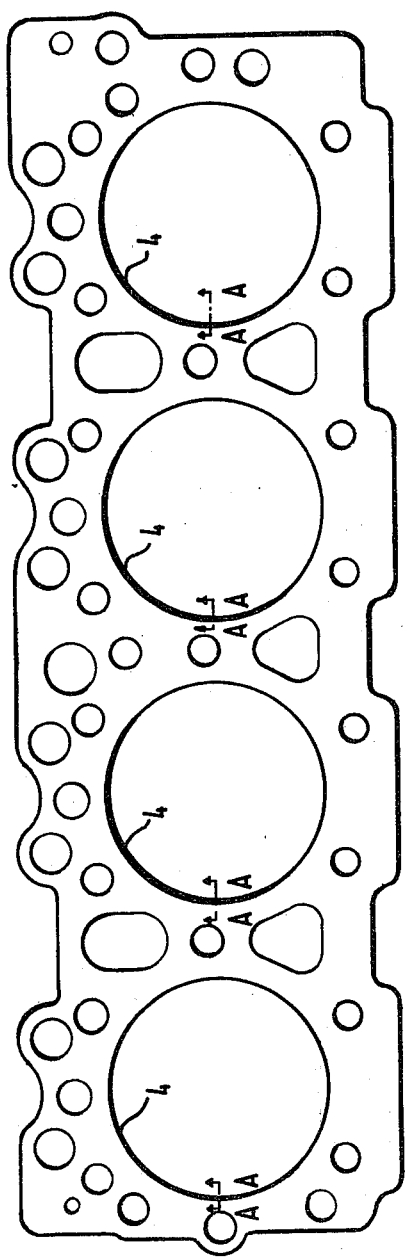
FIG. 1 is a general plan view of the gasket.

The gasket which is shown in the drawings and hereinafter described is intended to seal the joint between the cylinder block and the cylinder head of a bank of 4-cylinders of a V-8 compression ignition wet liner engine. The main part of this gasket is constructed in substantial accordance with the disclosure of my aforementioned co-pending patent applications. As shown most clearly in FIGS. 3, 4 and 5, it comprises two outer cold rolled mild steel bright annealed grade CS4 plates 1, each of 0.015 inches thickness and an interposed central composite spacer plate 2 which is 0.031 inches in thickness. This plate 2 is also of mild steel which has been bright annealed and softened. It has, however, been subjected to a skin rolling operation which has the effect of forming a hard metal layer on each of its surfaces. The gasket is coated overall with a 0.001 inch thick layer of copper. Apart from this the outer plates 1 are formed with corrugated configurations of two different forms. The paths of these corrugations on the gasket are illustrated in chain-dashed lines in FIG. 2, the chain lines being drawn at the peaks or locus points of the lines of corrugations.

Figure 2:
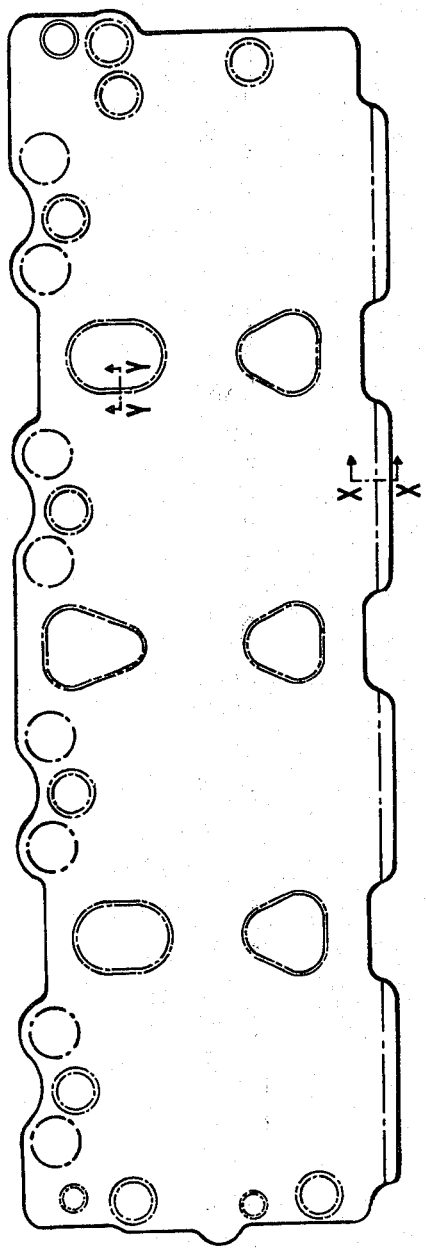
FIG. 2 is a view similar to FIG. 1, but showing the positions of corrugations in outer plates of the gasket.
Figure 3:
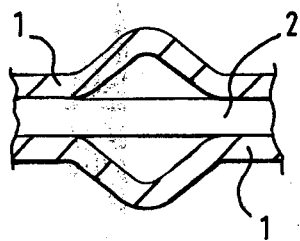
FIG. 3 is an enlarged section through a typical single wave corrugation shown in FIG. 2, e.g. on line X—X of FIG. 2.
Figure 4:
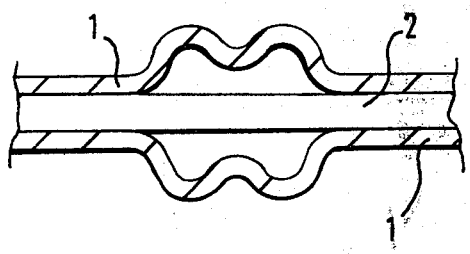
FIG. 4 is an enlarged section through a typical double wave corrugation shown in FIG. 2, e.g. on line Y—Y of FIG. 2.

Referring to FIG. 2 in conjunction with FIG. 3, one form of corrugation which runs along one side margin of the gasket is of single V-shaped profile. The single wave has an overall width of 0.063 inches and a height, measured from the outer surface plane of the plate 1 of 0.045 inches.

The other form of corrugation is shown in FIG. 2 in conjunction with FIG. 3 and is of double V-shaped profile. This double V-shaped profile has the characteristic defined in my pending Application Ser. No. 930,429, now U.S. Pat. No. 4,203,608 that the distance d between a plane which contains the base of the trough between the two waves is significantly less than the distance between the first plane and the base plane of the sheet. In the present instance, the overall width of the two waves is 0.125 inches, the distance between wave peaks is 0.063 inches and the distance d is 0.030 inches.

In order to understand how the gasket is equipped in order to ensure satisfactory gas tight sealing in the region of the four cylinder bores reference is now made to FIGS. 1, and 5–7.

Around each cylinder bore opening 4 in the gasket for a radial distance r (FIGS. 5 and 6), sufficient to bridge a wet liner 5 and the adjacent margin of the cylinder block 6, there is fitted between the plates 1 an amular washer 7 having annular serrations 7a on opposite sides. In the present typical instance the washers have an inside opening diameter of between 4.817 and 4.832 inches and an outside diameter of between 5.137 and 5.152 inches.

The maximum thickness of the washer 7, measured over the peaks of the serrations 7a, is 0.050 inches whilst the minimum thickness of the washer 7 measured between the troughs of the serrations 7a is 0.030 inches. The maximum thickness of the washer 7 thus somewhat exceeds the thickness of the spacer plate 2, thus ensuring high unit loading. The minimum thickness of the washer is appreciably less than that of the spacer plate 2 thus allowing ample space for receiving surplus material which flows under clamping pressure. The serrations also contribute towards a labyrinth seal effect.

The washers 7 are made in most cases of zinc plated steel, but occasionally from stainless steel, depending on the operating temperature.

Figure 5:
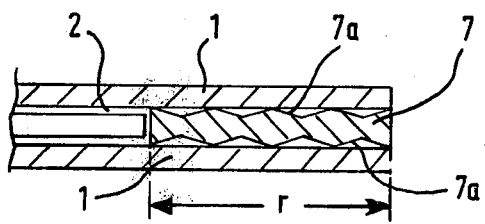
FIG. 5 is an enlarged section on any of lines A—A of FIG. 1.
Figure 7:
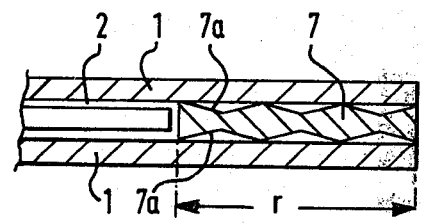
FIG. 7 is a view similar to that of FIG. 5 showing a further embodiment of the present invention.
Figure 6:
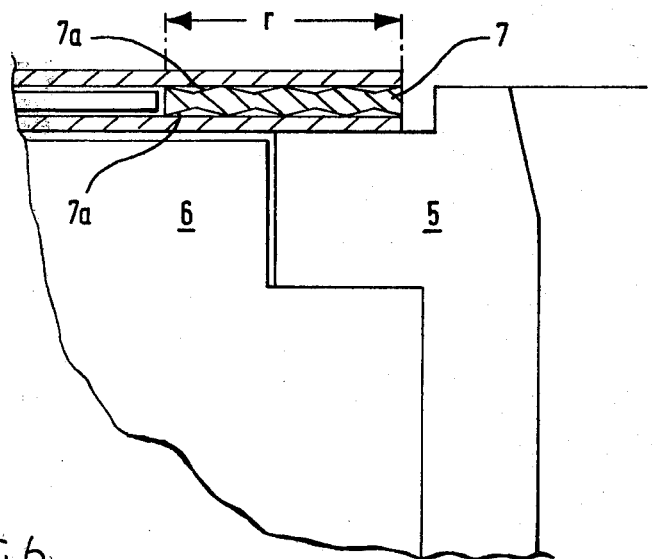
FIG. 6 is a partial view to illustrate the operational situation of a washer relative to a part of a cylinder block having a wet liner fitted therein.

FIG. 7 illustrates an annular washer formed in accordance with the present invention adapted for use with loads of slightly reduced values of those to which the washer of FIG. 5 may be put to use. It will be seen that the serrations 7a are somewhat wider and shallower than those in FIG. 5.

In general, the washers 7 (rings) are formed separately from the composite center plate. However, it is possible to produce them as an integral part of the center plate, although it would be difficult since it would then be necessary to produce the center plate with one set of characteristics and the washer with a totally different set.

The serrations can be made by pressing, to obtain the most desirable characteristics. However, it is best to machine the grooves, and treat as by heat or otherwise afterwards to obtain the required characteristics, i.e. density and ductility, to suit a combination of liner flange strength and Cylinder Block strength.

Further, by varying the pitch and depth of the grooves as well as hardness almost any desired characteristic can be obtained.

In practice, engines utilizing the seal of the present invention were subjected to a 2000 pounds per sq. inch nitrogen gas test, result perfect, after 50 hours running it was retested, result perfect, after 100 hrs. retested and still a perfect seal maintained.

Various modifications and changes are suggested above; others will be apparent to those skilled in the present art. The present application is intended, therefore, as being illustrative and not limiting of the invention.

What is claimed is:

1. A gasket for sealing the joint between the cylinder block and the cylinder head of a wet liner internal combustion engine comprising a pair of outer metal plates, a composite metal spacer plate disposed between the two outer plates, and a sealing washer disposed between the two outer plates around each cylinder bore opening, said sealing washer formed on each axial face with circumferential serrations of V-shaped profile, the thickness of the washer measured over the peaks of the serrations being somewhat greater than that of the composite spacer plate whereas the thickness measured between the troughs of the serrations is significantly less than that of the composite spacer plate, said sealing washer being deformable under the clamping pressure of said plates so that the material in the peaks of the serrations flow into the troughs of the serrations.

2. The gasket according to claim 1, wherein said outer metal plates have outwardly directed corrugations formed therein away from the cylinder bore openings and the spacer plate comprises a central soft metal layer and hard metal surface layers.

* * * * *